US012163621B2

(12) United States Patent
Xu et al.

(10) Patent No.: US 12,163,621 B2
(45) Date of Patent: Dec. 10, 2024

(54) ADJUSTABLE MOUNT FOR DISPLAY SCREEN

(71) Applicant: Xinadda (Shen Zhen) Products Co., Ltd, Shenzhen (CN)

(72) Inventors: Hao Xu, Shenzhen (CN); Xunyi Yang, Shenzhen (CN)

(73) Assignee: Xinadda (Shen Zhen) Products Co., Ltd, Shenzhen (CN)

( * ) Notice: Subject to any disclaimer, the term of this patent is extended or adjusted under 35 U.S.C. 154(b) by 0 days.

(21) Appl. No.: 18/092,185

(22) Filed: Dec. 30, 2022

(65) Prior Publication Data

US 2024/0218966 A1   Jul. 4, 2024

(51) Int. Cl.
| | |
|---|---|
| *F16M 13/02* | (2006.01) |
| *F16M 11/04* | (2006.01) |
| *F16M 11/10* | (2006.01) |
| *F16M 11/18* | (2006.01) |

(52) U.S. Cl.
CPC .......... *F16M 13/02* (2013.01); *F16M 11/046* (2013.01); *F16M 11/105* (2013.01); *F16M 11/18* (2013.01); *F16M 2200/025* (2013.01); *F16M 2200/063* (2013.01)

(58) Field of Classification Search
CPC .... F16M 13/02; F16M 11/046; F16M 11/105; F16M 11/18; F16M 2200/025; F16M 2200/063
USPC ...................................... 248/284.1, 917–922
See application file for complete search history.

(56) References Cited

U.S. PATENT DOCUMENTS

| | | | |
|---|---|---|---|
| 5,108,063 A | 4/1992 | Koerber et al. |
| 7,300,029 B2 | 11/2007 | Petrick et al. |
| 7,546,745 B2 | 6/2009 | Lee et al. |
| 7,641,163 B2 | 1/2010 | O'Keene |
| 7,673,839 B2 | 3/2010 | Zhang et al. |
| 7,950,613 B2 | 5/2011 | Anderson et al. |
| 7,992,832 B2 | 8/2011 | Zhang et al. |

(Continued)

FOREIGN PATENT DOCUMENTS

| | | |
|---|---|---|
| CN | 206112451 U | 4/2017 |
| EM | 001673989-0011 | 3/2010 |
| GB | 9005234804-0007 A | 3/1990 |

OTHER PUBLICATIONS

PEI, International Pub. No. WO2019/134330 A1, Jul. 11, 2019.
Newville, International Pub. No. WO2019/043670 A1, Mar. 7, 2019.

*Primary Examiner* — Muhammad Ijaz
(74) *Attorney, Agent, or Firm* — David E. Crawford; Crawford I.P. Law

(57) ABSTRACT

An adjustable mount including a bracket adapted for anchoring the bracket to a surface and an elongated link pivotally connected to the bracket. A faceplate adapted for connecting to the display screen is pivotally connected to the link. The faceplate has a rail below the link. A body is slidably mounted on the rail, and a clamp alternatively holds the body at a selected position on the rail. The mount includes a pair of elongated bars. Each bar is pivotally connected to the bracket below the link and pivotally connected to the faceplate below the link. The mount has one gas spring pivotally connected to the bracket below the link and above each bar and pivotally connected to the body. The faceplate is moveable to raise and lower the display screen. A force required to move the faceplate changes depending upon the selected position of the body on the rail.

13 Claims, 20 Drawing Sheets

(56) References Cited

U.S. PATENT DOCUMENTS

| | | | | |
|---|---|---|---|---|
| 8,074,950 B2 | * | 12/2011 | Clary | F16M 11/048 |
| | | | | 473/483 |
| 8,235,342 B2 | | 8/2012 | Pfister et al. | |
| 8,245,990 B2 | | 8/2012 | Huang | |
| 8,262,044 B2 | * | 9/2012 | Luijben | F16M 11/10 |
| | | | | 248/920 |
| 8,333,355 B2 | * | 12/2012 | Stifal | F16M 11/2092 |
| | | | | 248/920 |
| 8,382,052 B1 | | 2/2013 | Mathieson et al. | |
| 8,561,955 B2 | | 10/2013 | Stemple | |
| 8,724,037 B1 | | 5/2014 | Massey | |
| 8,864,092 B2 | * | 10/2014 | Newville | F16M 13/02 |
| | | | | 361/679.01 |
| 8,870,140 B2 | | 10/2014 | Stemple | |
| 9,625,091 B1 | * | 4/2017 | Massey | F16M 11/04 |
| 9,759,376 B2 | | 9/2017 | Xiang et al. | |
| 9,876,984 B2 | | 1/2018 | Massey | |
| 10,024,490 B2 | | 7/2018 | Lam et al. | |
| 10,257,460 B2 | | 4/2019 | Massey | |
| 10,277,860 B2 | | 4/2019 | Massey | |
| 10,281,080 B1 | * | 5/2019 | Massey | F16M 11/00 |
| 10,595,634 B2 | | 3/2020 | Pei | |
| 10,738,941 B2 | * | 8/2020 | Newville | F16M 11/2092 |
| 10,935,180 B1 | | 3/2021 | Massey | |
| 10,944,937 B2 | | 3/2021 | Pei | |
| D915,362 S | * | 4/2021 | Pei | D14/239 |
| 11,178,354 B2 | | 11/2021 | Massey | |
| 11,287,080 B2 | * | 3/2022 | Newville | F16M 11/2014 |
| 2009/0173860 A1 | * | 7/2009 | Remy | F16M 11/2014 |
| | | | | 248/278.1 |
| 2012/0033371 A1 | | 2/2012 | Pankros et al. | |
| 2012/0061543 A1 | | 3/2012 | Juan | |
| 2019/0082824 A1 | * | 3/2019 | Matlin | A47B 21/0314 |
| 2019/0203873 A1 | * | 7/2019 | Pei | F16M 11/16 |
| 2019/0203875 A1 | * | 7/2019 | Yu | F16M 11/42 |
| 2019/0390817 A1 | * | 12/2019 | Pei | F16M 11/08 |
| 2020/0340614 A1 | * | 10/2020 | Pei | F16M 11/08 |
| 2020/0355319 A1 | | 11/2020 | Newville et al. | |
| 2020/0408353 A1 | | 12/2020 | Massey | |
| 2021/0010632 A1 | * | 1/2021 | Pei | F16M 13/02 |
| 2021/0035402 A1 | * | 2/2021 | Rye | G07F 17/3216 |
| 2021/0254780 A1 | | 8/2021 | Massey | |
| 2023/0016050 A1 | * | 1/2023 | Newville | F16M 11/046 |
| 2023/0300289 A1 | * | 9/2023 | Massey | F16M 11/10 |
| | | | | 248/284.1 |

* cited by examiner

ADJUSTABLE MOUNT FOR DISPLAY SCREEN

BACKGROUND

The present disclosure relates to mounts for display screens and more particularly to a height adjustable wall mount for a display screen.

A display screen such as a flat-panel television, a gaming monitor, or other device having a screen is usually positioned for viewing so a center of the screen is about level with a typical viewer's eyes. Prolonged viewing of display screens positioned substantially above or below eye level can cause viewer discomfort. Even so, many homeowners choose to mount a display screen on a wall above a fireplace, frequently over a mantel that protrudes from the wall. Although this position allows a standing viewer to have an unobstructed view of the display screen when others are seated between the viewer and the screen, the position is usually well above eye level, particularly for seated viewers. For this reason, some display screen wall mounts include a linkage allowing the screen to be lowered for viewing and raised to return the screen to its stowed position above the fireplace. These linkages frequently are adapted to position the display screen near the wall when stowed but farther from the wall when lowered so the display screen avoids contacting the mantel.

Display screens provide an optimal image when viewed head on (i.e., from a point along a line extending normal to the center of the screen). As a viewer moves away from this optimal position, image quality suffers. For example, viewing a display screen from more than a few degrees to the side of center or a few degrees above or below center can severely degrade image quality. To ensure peak image quality, some display screen mounts allow the screen to be pivoted side-to-side and/or tilted up-and-down to reduce the angle from head on.

Display screens are available in a variety of sizes. Further, display screen mount interface configurations vary from manufacturer to manufacturer, between models, and over time. Thus, display screen mounts preferably support display screens having a range of differing sizes and adapt to connect to a variety of differing interface configurations. As display screens increase in size, the weight of these devices also increases. As the weight increases, ensuring mounts are securely anchored to a wall becomes more critical. Accordingly, it is advisable for display screen mount systems to include optional mounting brackets to accommodate heavier display screens on walls having differing constructions. In addition, these heavier display screens becomes more cumbersome for users to move the devices when adjusting screen height. For this reason, display screen mounts frequently include counterbalancing mechanisms to reduce the effort required to move the devices. Further, because display screen weights vary widely, these counterbalancing mechanisms are preferably adjustable to change the weight carried by the mechanism. Otherwise, a mount that carries too little load may cause a user to struggle to lift the device, and a mount that carries too much load may cause a user to struggle to lower the device.

In view of the above, there remains a need for innovative display screen mounts for use above a fireplace that is adjustable to accommodate viewers in a variety of positions and display screens of differing sizes, weights, and mount interface configurations.

SUMMARY

In one aspect, the present disclosure includes an adjustable mount for mounting a display screen on a selected vertical surface. The mount comprises a bracket adapted for anchoring the bracket to the selected vertical surface. Further, the mount includes an elongated upper link pivotally connected to the bracket and a faceplate adapted for operatively connecting the display screen thereto pivotally connected to the upper link. The faceplate has a rail extending downward below the upper link. The mount also includes a body slidably mounted on the rail and a clamp alternatively operable to hold the body at a selected position on the rail and to permit the body to move with respect to the rail. In addition, the mount includes a pair of elongated bars. Each bar of the pair of elongated bars is pivotally connected to the bracket below the upper link and pivotally connected to the faceplate below the upper link. The mount also comprises one gas spring pivotally connected to the bracket below the upper link and above each bar of the pair of bars. The gas spring is pivotally connected to the body. The faceplate is moveable relative to the bracket when anchored to the vertical surface to raise and lower the display screen relative to the surface when the display screen is connected to the faceplate. A force required to move the faceplate relative to the bracket changes depending upon the selected position of the body on the rail.

In another aspect, the present disclosure includes an adjustable mount for mounting a display screen on a selected vertical surface. The mount comprises a bracket adapted for anchoring the bracket to the selected vertical surface, an elongated upper link pivotally connected to the bracket, and a faceplate adapted for operatively connecting the display screen thereto pivotally connected to the upper link. The mount also includes a pair of elongated bars. Each bar of the pair of elongated bars is pivotally connected to the bracket below the upper link and pivotally connected to the faceplate below the upper link. Further, the mount comprises one gas spring pivotally connected to the bracket below the upper link and above each bar of the pair of bars. The gas spring is operatively connected to the faceplate for pivoting relative to the faceplate and for moving up and down relative to the faceplate. The faceplate is moveable relative to the bracket when anchored to the vertical surface to raise and lower the display screen relative to the surface when the display screen is connected to the faceplate. A force required to move the faceplate relative to the bracket changes depending upon the select position of the body relative to the faceplate.

BRIEF DESCRIPTION OF DRAWINGS

This disclosure includes non-limiting examples that are illustrated in the accompanying drawings.

Corresponding reference characters indicate corresponding parts throughout the drawings.

DETAILED DESCRIPTION

Figure 1:
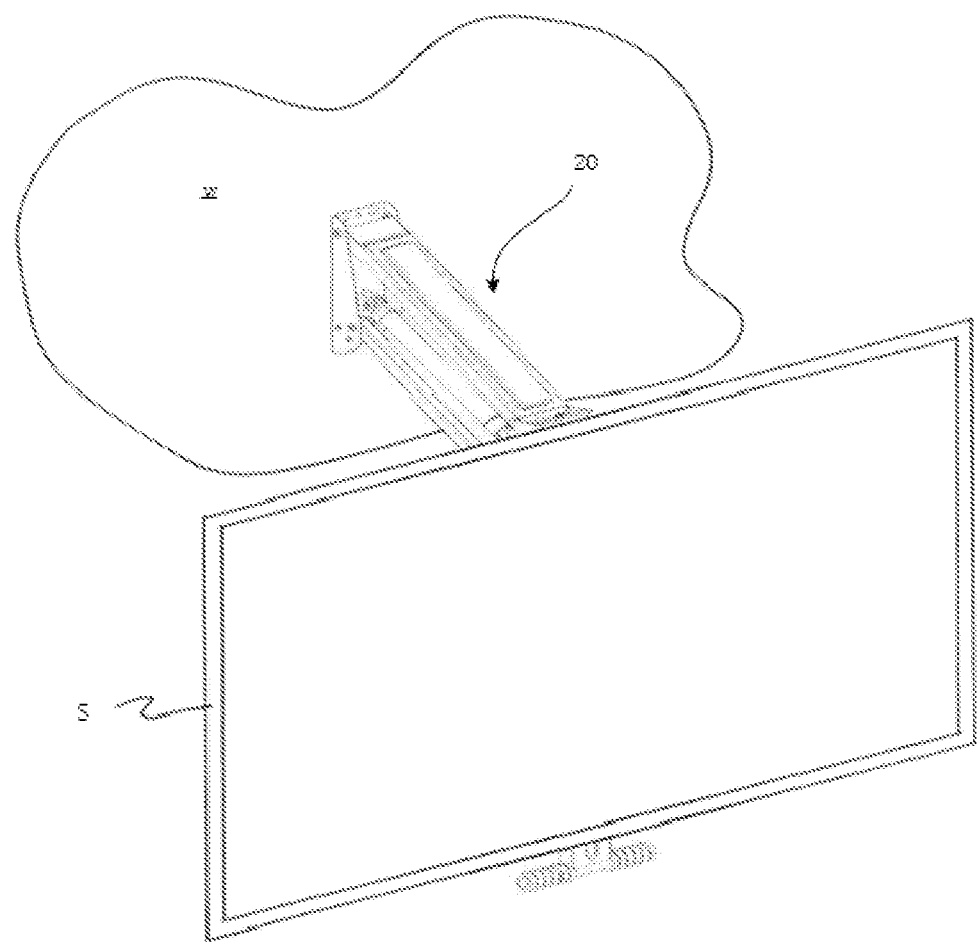
FIG. 1 is a perspective of an adjustable mount for attaching a display screen to a wall.
Figure 2:
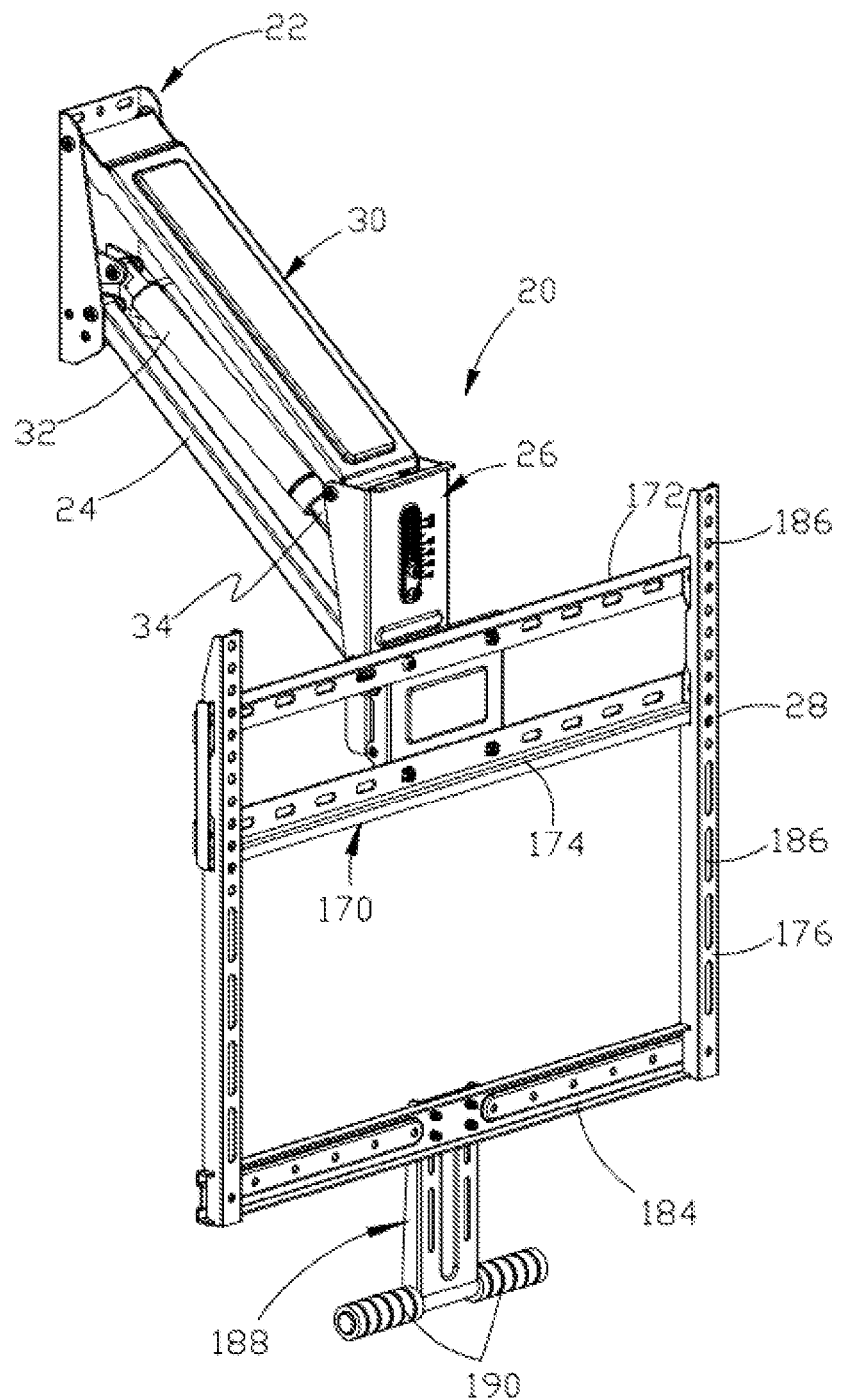
FIG. 2 is a perspective of the adjustable mount of FIG. 1 shown without the display screen wall.

As illustrated in FIG. 1, one example of a height adjustable mount for a display screen is designated in its entirety by the reference character 20. The mount 20 supports a display screen S, such as a flat-panel television, a gaming monitor, or other electronic device having a display. Further, the mount 20 attaches the display screen S to a surface W, such as a vertical wall, including a wall W above a fireplace. As shown in FIG. 2, the mount 20 generally comprises a bracket (generally designated by 22), a linkage assembly (generally designated by 24) having a balance adjustment mechanism (generally designated by 26), and a screen support (generally designated by 28). In addition to the force balancing mechanism 26, the linkage assembly 24 includes an upper link (generally designated by 30), a gas spring (generally designated by 32), a pair of lower bars (generally designated by 34), a pivot plate (generally designated by 36), and a tilt plate (generally designated by 38).

Figure 3:
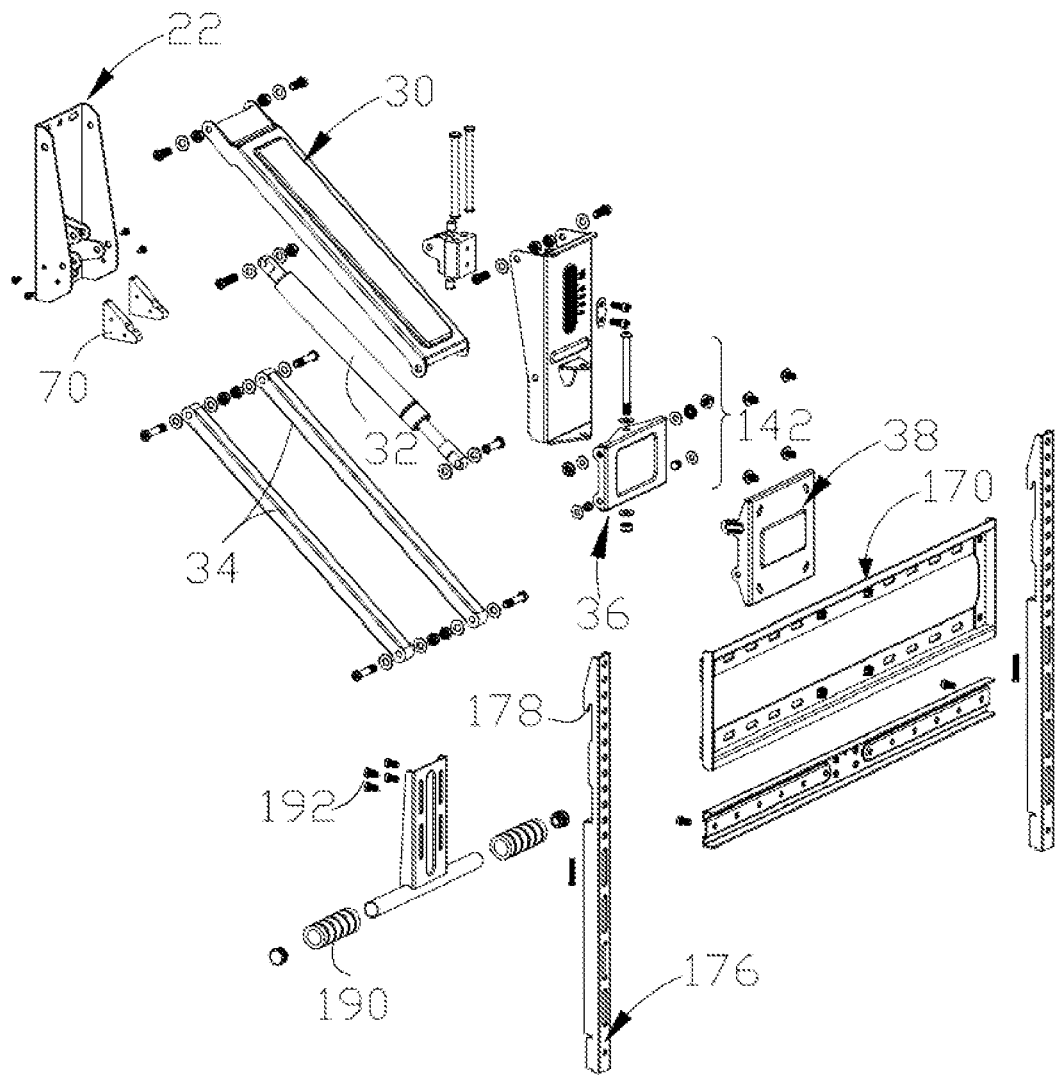
FIG. 3 is a separated perspective of the adjustable mount of FIG. 2.
Figure 4:
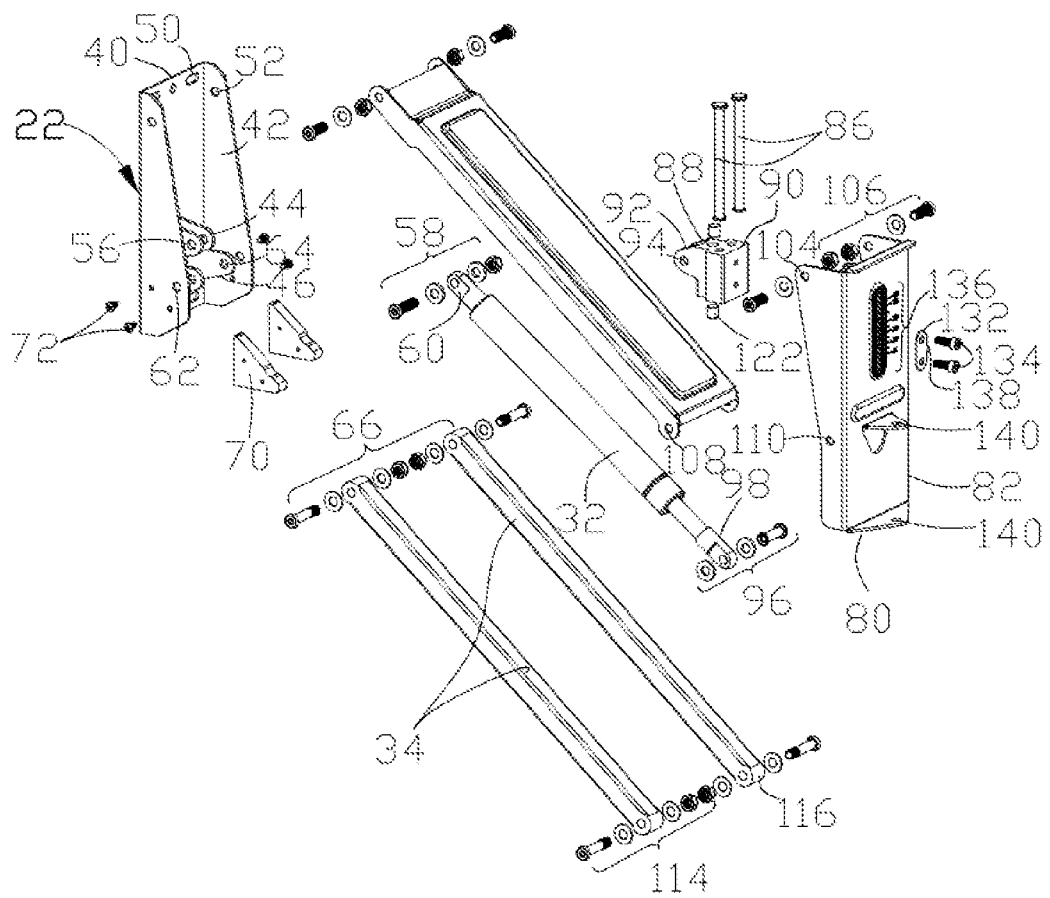
FIG. 4 is an enlarged detail of FIG. 3 showing elements generally related to height adjustment.
Figure 5:
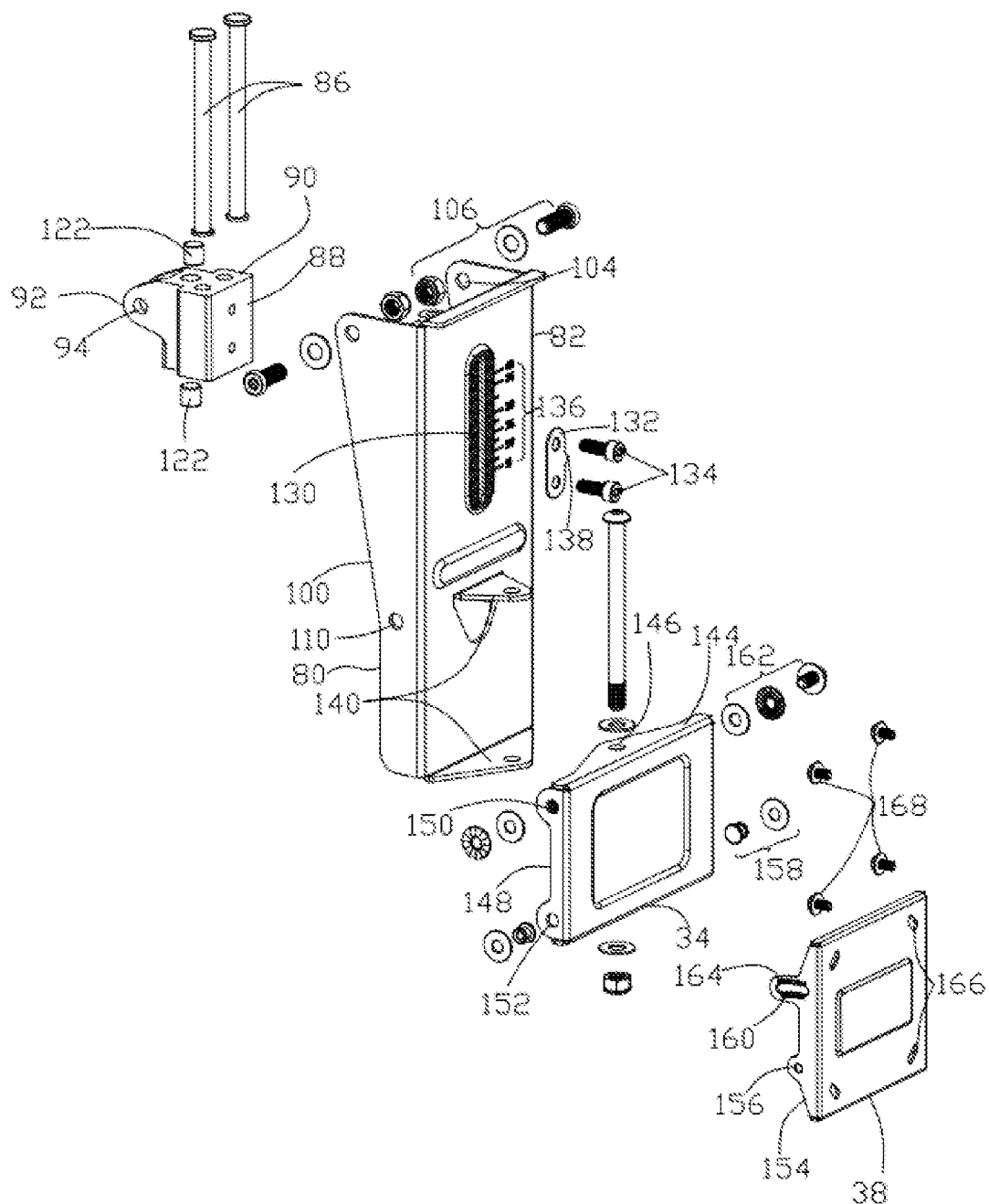
FIG. 5 is an enlarged detail of FIG. 3 showing elements generally related to force balance adjustment.
Figure 6:
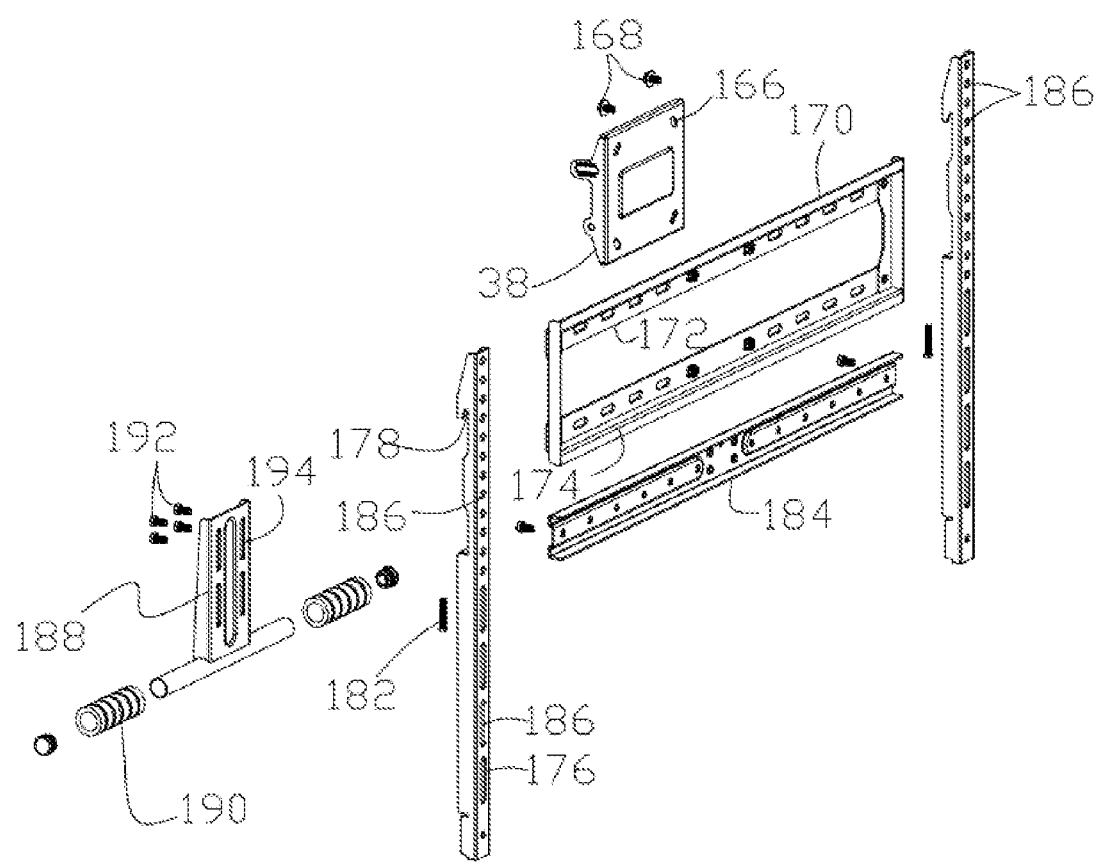
FIG. 6 is an enlarged detail of FIG. 3 showing elements generally related to displace screen support.

As illustrated in FIGS. 3-5, the bracket 22 includes a wall plate 40 having opposite side flanges 42, a pair of central flanges 44, and a pair of lower intermediate flanges 46. Mounting holes 48 are provided through the wall plate 40 for accepting anchor bolts (not shown) to attach the bracket 22 in a selected position on the wall W. The side flanges 42 have a pair of spaced upper holes 50 for receiving fastener assemblies 52 to pivotally connect a wall end 54 of the upper link 30 to the bracket 22. The central flanges 44 having corresponding holes 56 for receiving a fastener assembly 58 to pivotally connect a wall end 60 of the gas spring 32 to the bracket 22 below the upper link 30. Each side flange 42 has a of lower hole 62 aligned with corresponding holes 64 in the lower intermediate flanges 46. Fastener assemblies 66 pivotally attach a wall end 68 of each bar 34 to each hole 62, 64 as shown. Although the fastener assemblies may comprise other combinations of fastener elements, each illustrated fastener assembly 52, 58, 66 includes a machine screw, a locking nut, and corresponding washers. As further shown in FIGS. 4 and 5, a generally triangular stopping block 70 is attached to each side flange 42 below the wall end 68 of each bar 34 using conventional screw fasteners 72, such as sheet metal screws.

Figure 7:
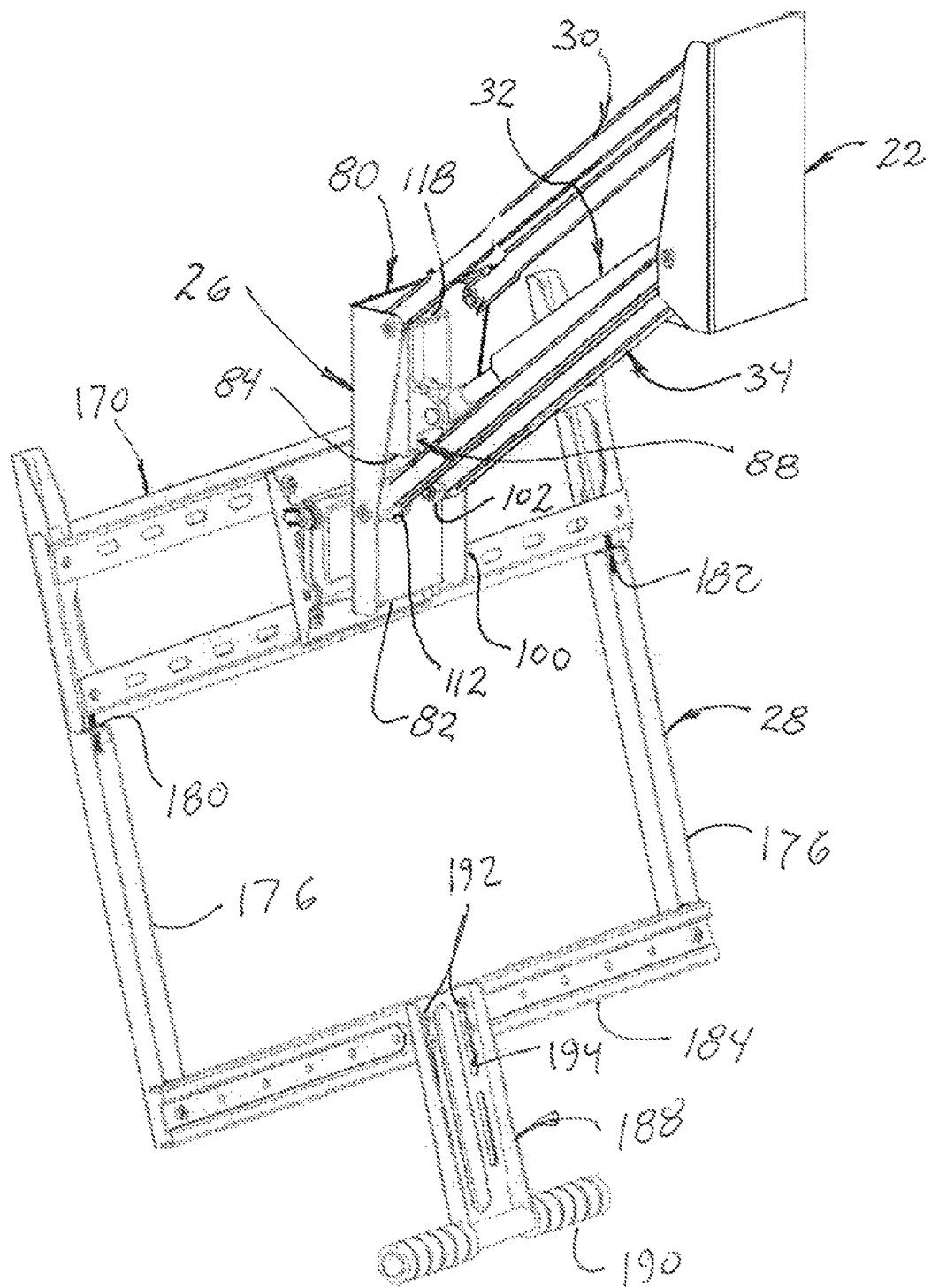
FIG. 7 is a perspective of the adjustable mount shown from a viewpoint generally opposite to that of FIG. 2.
Figure 8:
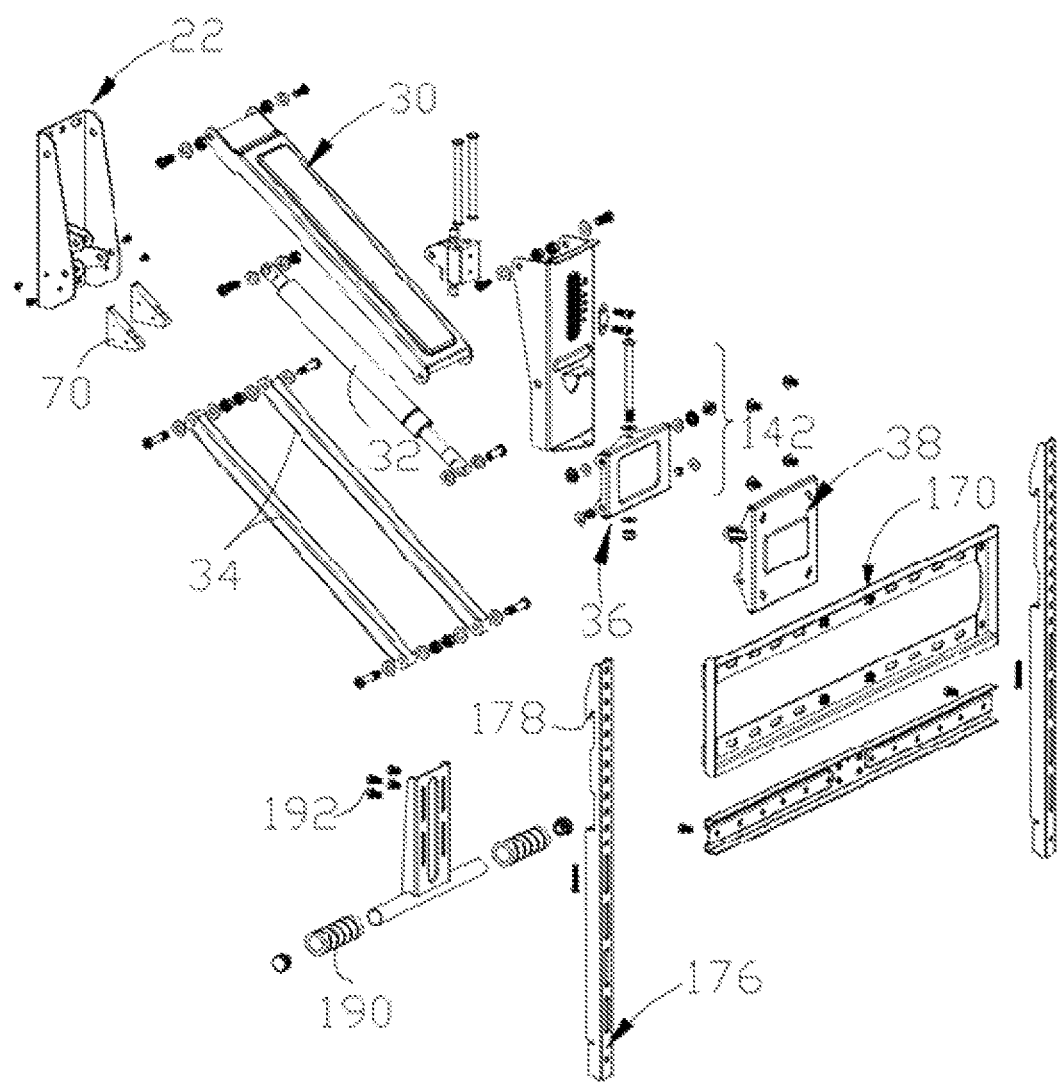
FIG. 8 is a separated perspective of the adjustable mount of FIG. 7.
Figure 9:
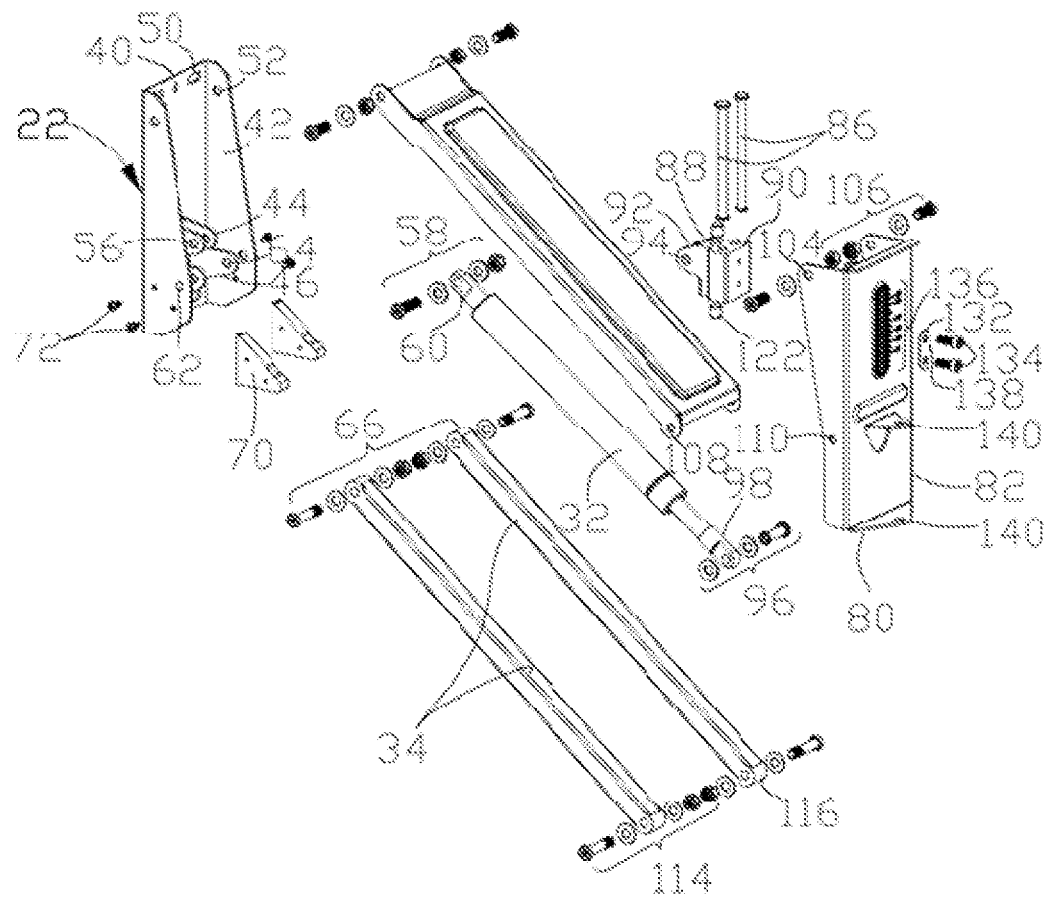
FIG. 9 is an enlarged detail of FIG. 8 showing elements illustrated in FIG. 4.

FIGS. 7-9 illustrate the mount 20 from a viewpoint generally opposite that of FIG. 3. As shown in FIGS. 8 and 9, the balance adjustment mechanism 26 comprises a main housing (generally designated by 80), including a faceplate 82 having a rectangular brace 84 to which a pair of cylindrical vertical rods or rails 86 are attached and a slide body (generally designated by 88). The slide body 88 includes a pair of cylindrical openings 90 sized and oriented to slidably receive the vertical rails 86 attached to the brace 84 to allow the body to freely move vertically along the rails. A pair of spaced flanges 92 extend from the body 88 opposite the faceplate 82. A hole 94 is provided through each flange 92 for receiving a fastener assembly 96 to pivotally connect a viewer end 98 of the gas spring 32 to the slide body 88. A side flange 100 extends from each side of the faceplate 82, and a pair of intermediate flanges 102 extends from the faceplate below the brace 84. Each side flange 100 has an upper hole 104 for receiving fastener assemblies 106 to pivotally connect a viewer end 108 of the upper link 30 to the adjustment mechanism 26. Each side flange 100 also has a lower hole 110 aligned with a hole 112 in the corresponding intermediate flange 102. A fastener assembly 114 pivotally attaches a viewer end 116 of each bar 34 to each hole 110, 112 as shown. As will be appreciated, the pinned arrangement of the bracket 22, the upper link 30, the faceplate 82, and the lower bars 34 forms a four-bar linkage that maintains the angular relationship between the bracket and faceplate as the upper link and lower bars allow the faceplate to move up and down relative to the backet. A threaded reinforcement 118 is affixed to the brace 84 adjacent each end of the rails 86. The reinforcement 118 is adapted to selectively receive a threaded key 120 to push the body 88 along the rails 86 when the mount 20 is in use and the mechanism 26 is under load from the weight of the display screen. Hardened inserts 122 are provided in the body 88 where the key 120 contacts the body to prevent the key from scoring the body as the key turns.

Figure 10:
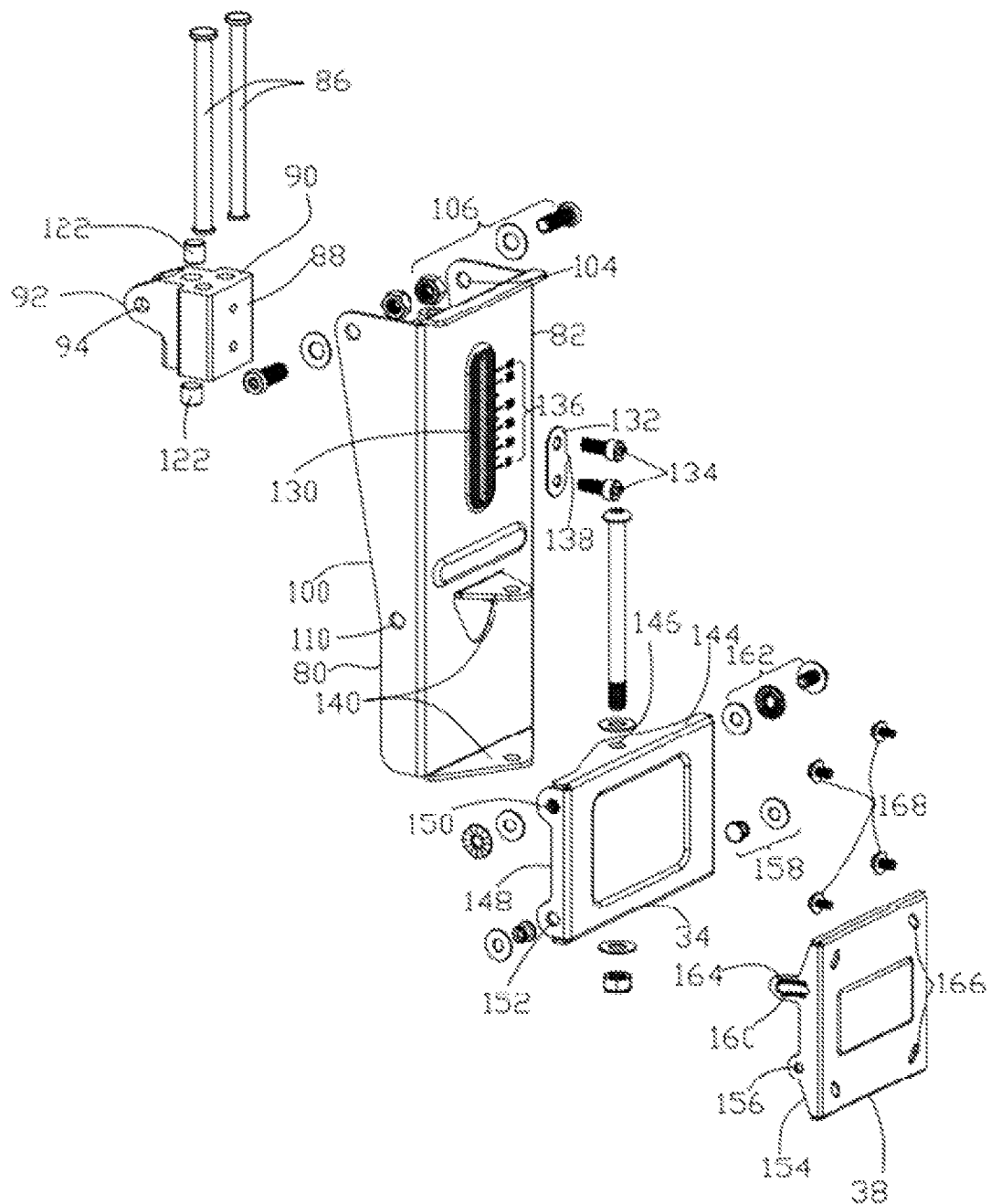
FIG. 10 is an enlarged detail of FIG. 8 showing elements illustrated in FIG. 5.
Figure 11:
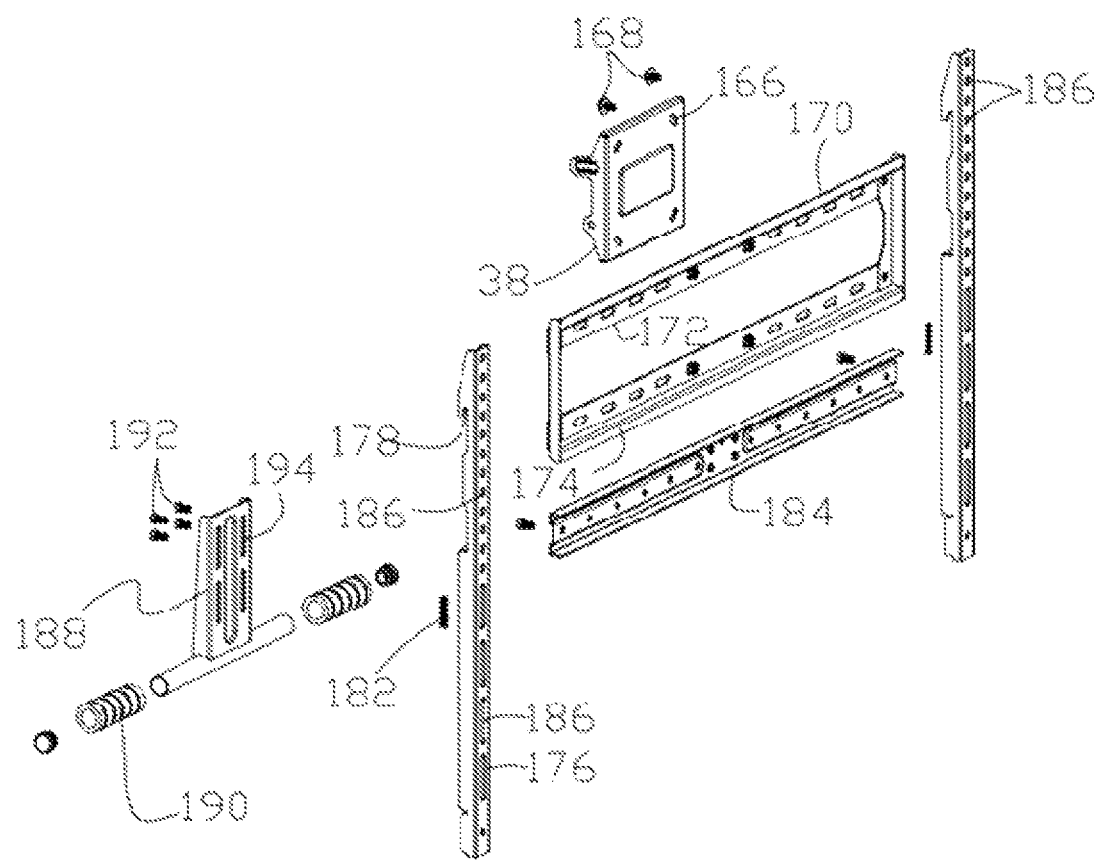
FIG. 11 is an enlarged detail of FIG. 8 showing elements illustrated in FIG. 6.
Figure 12A:
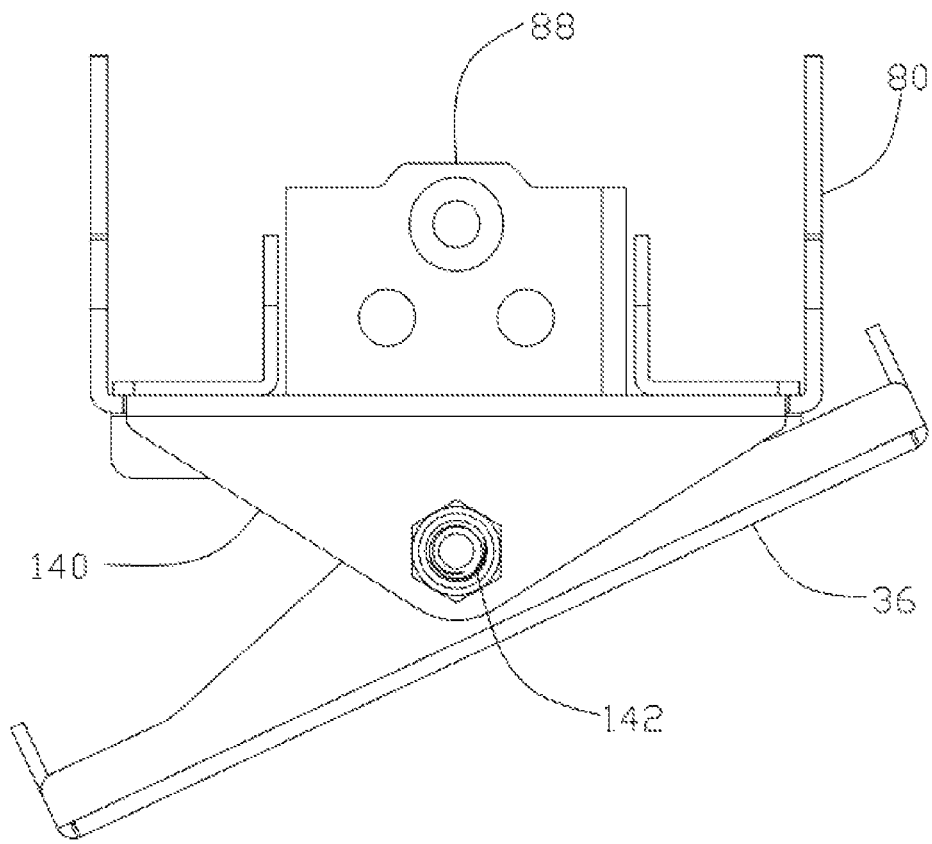
FIGS. 12A and 12B are top plans of a pivot connection of the mount at opposite extremes.
Figure 12B:
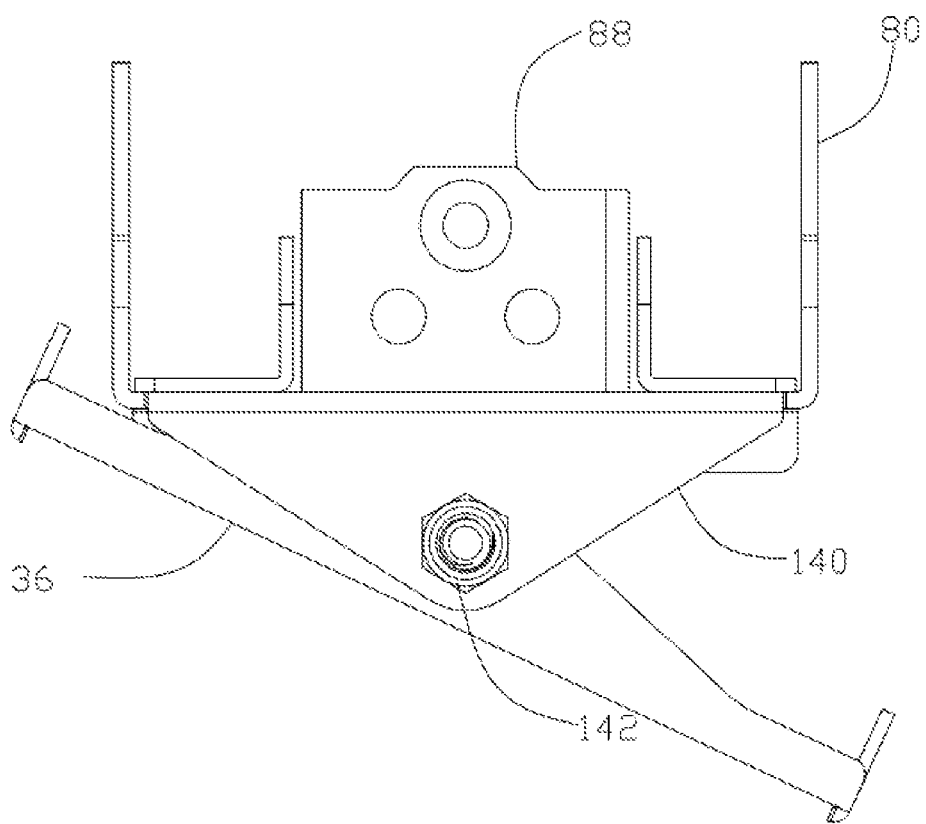
Figure 13A:
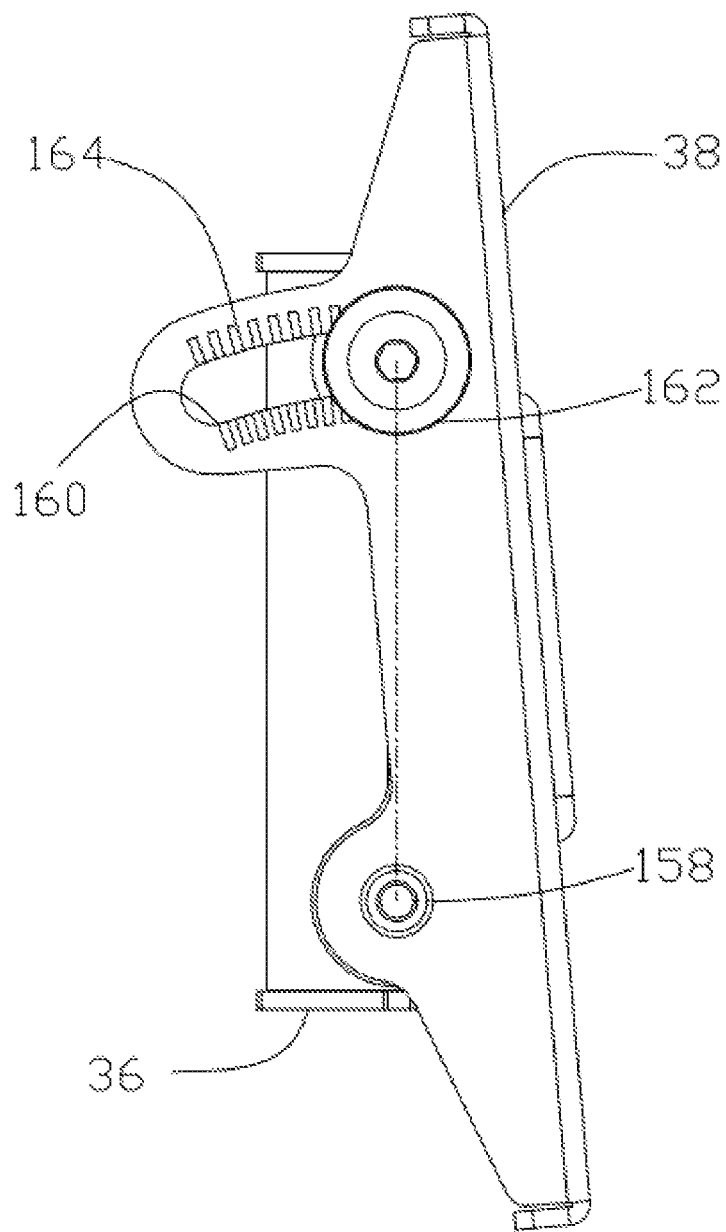
FIGS. 13A and 13B are side elevations of a tilt connection of the mount at opposite extremes.
Figure 13B:
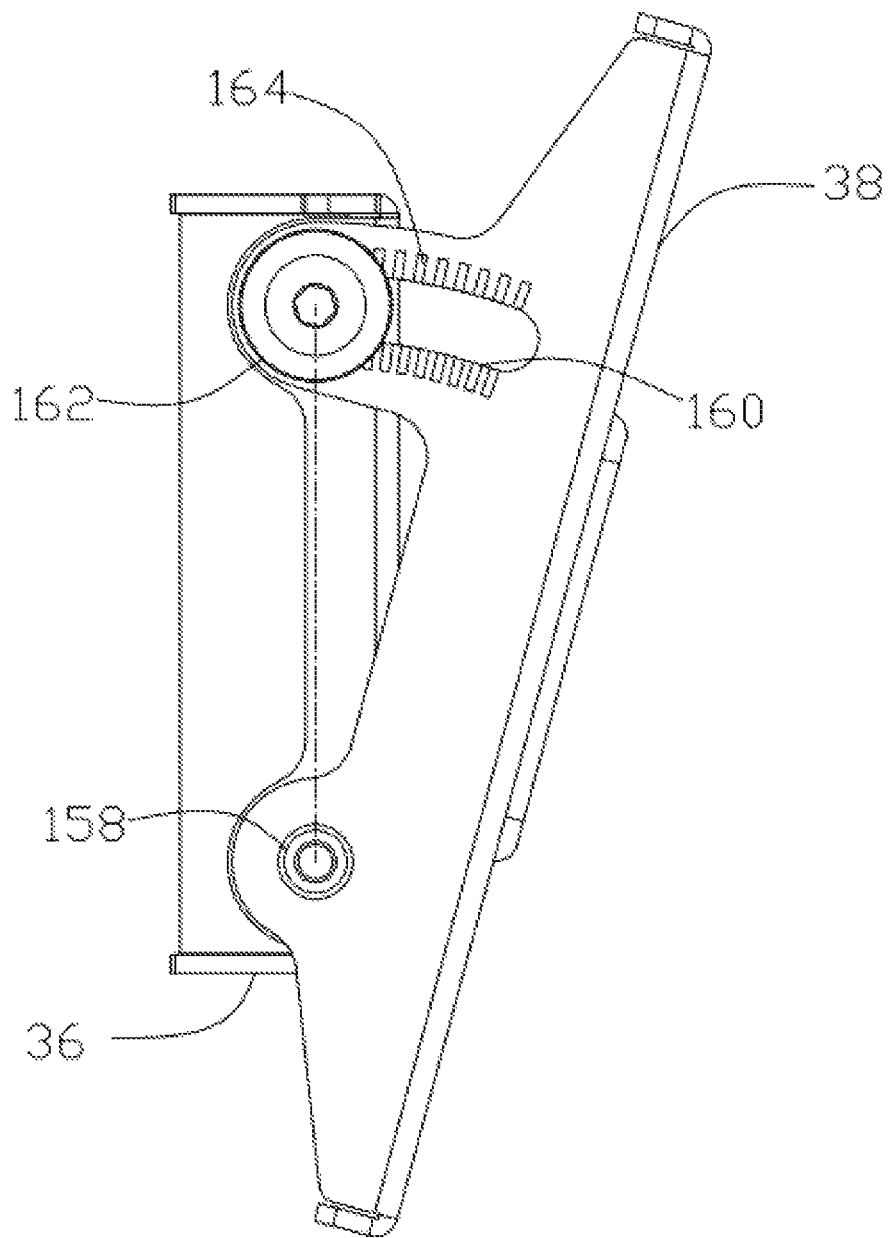

As illustrated in FIGS. 5 and 10, the faceplate 82 includes a vertical slot 130. A clamping element 132 is attached to the slide body 88 by the screw fasteners 134 (e.g., machine screws). As will be appreciated, the screw fasteners 134 may be tightened to clamp the slide body 88 to the faceplate 82 so the position of the slide body is fixed along the rails 86. A scale 136 is provided on the faceplate 82 and an indicator 138 is provided on the clamping element 132 to allow a user to determine a relative position of the slide body 88 with respect to the faceplate. A pair of supports 140 extend from the faceplate 82 below the slot 130 for receiving a fastener assembly 142 to pivotably connecting the pivot plate 36 to the balance adjustment mechanism 26. The pivot plate 36 incudes a pair of horizontal flanges 144 having holes 146 for receiving the fastener assembly 142 so the pivot plate is free to rotate relative to the adjustment mechanism about the fastener assembly. The pivot plate 36 also includes opposite side flanges 148. Each side flange 148 includes an upper hole 150 and a lower hole 152. The tilt plate 38 also has opposite side flanges 154. Each tilt plate side flange 154 includes a lower hole 156 adapted to receive a fastener assembly 158 to attach the tilt plate to the corresponding lower hole 152 in the pivot plate side flange 148 so the tilt plate is selectively rotatable relative to the pivot plate 36 about its lower holes. Each tilt plate side flange 154 also includes an arcuate slot 160 above its lower hole 156 for receiving a fastener assembly 162 to connect the tilt plate 38 to the pivot plate 36. As will be appreciated, the arcuate slots 160 allow the tilt plate 38 to rotate about the lower holes 156. A series of ridges 164 extend from arcuate edges of each arcuate slot 160 to increase friction between the tilt plate side flange 154 and the fastener assemblies 162 to prevent the fasteners from loosening. The connection formed between the pivot plate 36 and the faceplate 82 allows the user to pivot the display from side to side as shown in FIGS. 12A and 12B. Although the pivot plate connection may be configured to pivot through other angles, the illustrated pivot connection allows the display screen to pivot about 25° in each direction. The connection formed between the tilt plate 38 and the pivot plate 36 allows the user to tilt the display forward and back as shown in FIGS. 13A and 13B. Although the tilt plate connection may be configured to pivot through other angles, the illustrated connection allows the top of the display screen to tilt forward through an angle of about 15° as shown in FIG. 13B and to tilt backward through an angle of about 5° as shown in FIG. 13A. Moreover, the tilt plate 38 includes four oblique slots 166 for connecting the screen support 28 to the tilt plate using screw fasteners 168. As will be appreciated, the oblique slots 166 allow the screen support 28 to be rotated relative to the tilt plate 38 to level the display screen. Although the oblique slots may be configured to allow the screen support 28 to rotate through other angles, the illustrated connection allows the display screen to rotate through an angle of about 5° to each side.

Figure 14A:
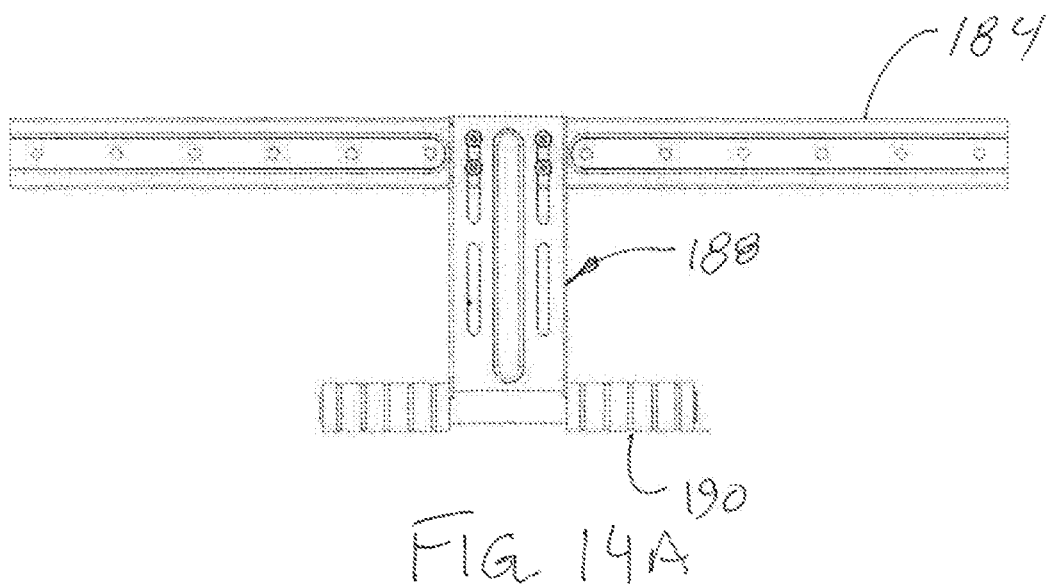
FIGS. 14A and 14B are front elevations of a handle assembly connected to a portion of a screen support in differing positions.
Figure 14B:
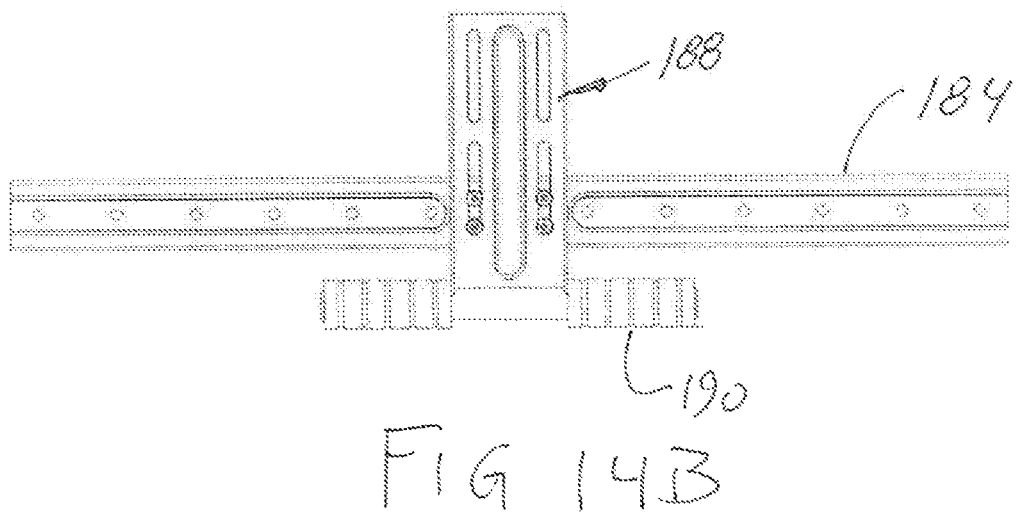

Referring to FIGS. 2, 6, 7, and 11, the screen support 28 includes a hanger, generally designated by 170, having an upper crossbar 172 and a lower crossbar 174. Vertical display support members 176 hang from the upper crossbar 172. Each support member 176 includes a hooked opening 178 that is adapted to engage with the upper crossbar 172. Each support member 176 also includes a threaded hole 180 for receiving a screw fastener 182 to engage the lower crossbar 174 to prevent the hook 178 in vertical support members 176 from disengaging the upper crossbar 172. A horizontal cross member 184 is connected across the lower ends of each of the vertical support members 176 to add rigidity to the screen support 28. Spaced openings 186 are provided along each vertical support member 176 to connect the members to the display screen using screw fasteners (not shown). As further illustrated, a handle assembly 188 having opposite grips 190 is attached to the cross member 184 by screw fasteners 192. The handle assembly 188 has elongated openings 194, allowing the handle assembly to be adjusted up and down relative to the cross member 184 as shown in FIGS. 14A and 14B to accommodate display screens having different sizes. As will be appreciated the handle assembly 190 provides a grip for a user to grasp when moving the screen support 28.

Figure 15:
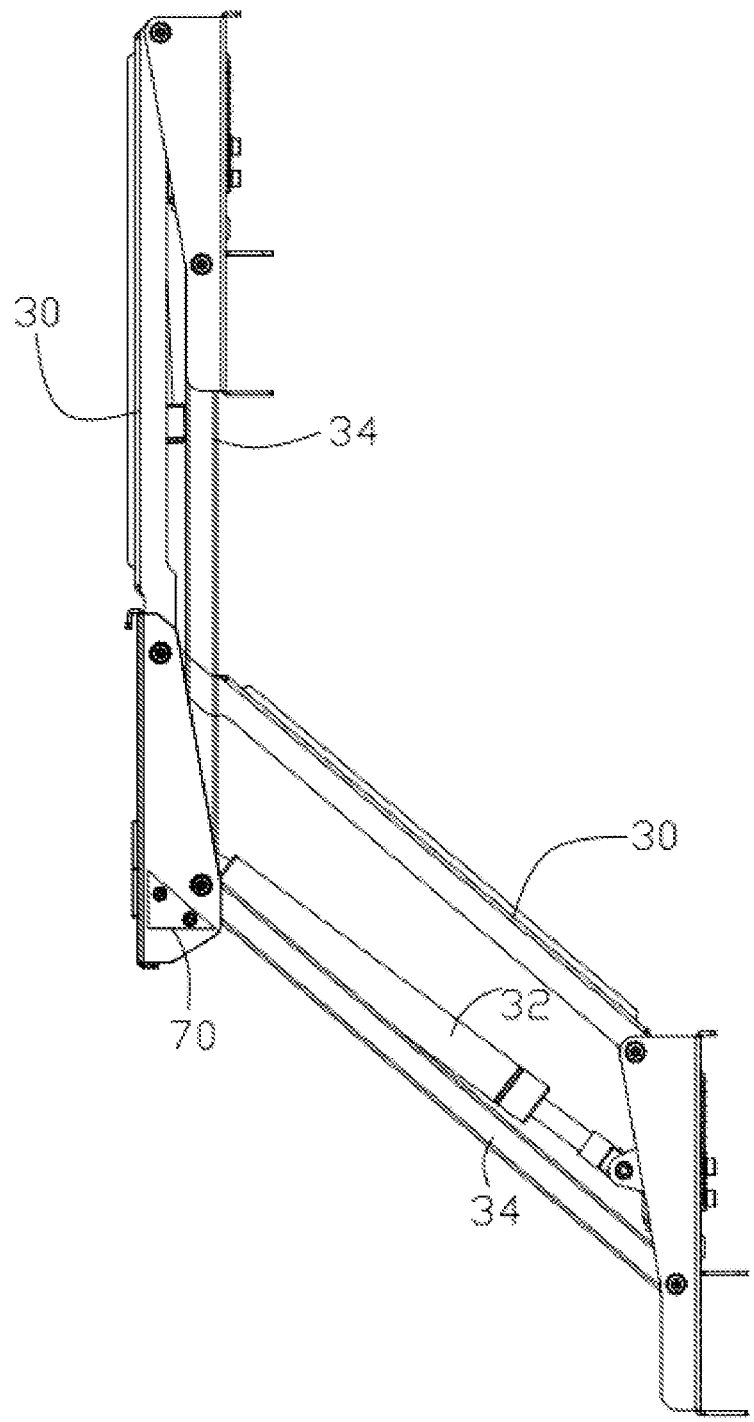
FIG. 15 is a side elevation of the mount shown in a stowed position and in a lowest position.

As illustrated in FIG. 15, the mount 20 described above allows a display screen to the raised to an elevated or stowed position as shown in solid lines in which the upper link 30, the gas spring 32, and the lower bars 34 extend upward from bracket 22. The mount 20 also allows the display screen to be lowered to a lowest viewing position as shown in dashed lines in which each bar 34 contacts the corresponding stopping block 70 (shown in broken lines). Preferably, the mount 20 is positioned sufficiently above a mantel or other obstruction that the bars 34 engage the stopping blocks 70 to stop the bars from rotating into the mantel. As shown in FIG. 15, the mount moves the display screen away from the wall as the screen moves from the stowed position to the lowest position. This movement allows the display screen to extend below the mantel when the user lowers the mount. Although the four-bar linkage and stopping blocks 70 may be configured to allow the screen support 28 to rotate through other angles, the illustrated configuration allows the upper member 30 to rotate through an angle of about 130° from vertical.

Figure 16:
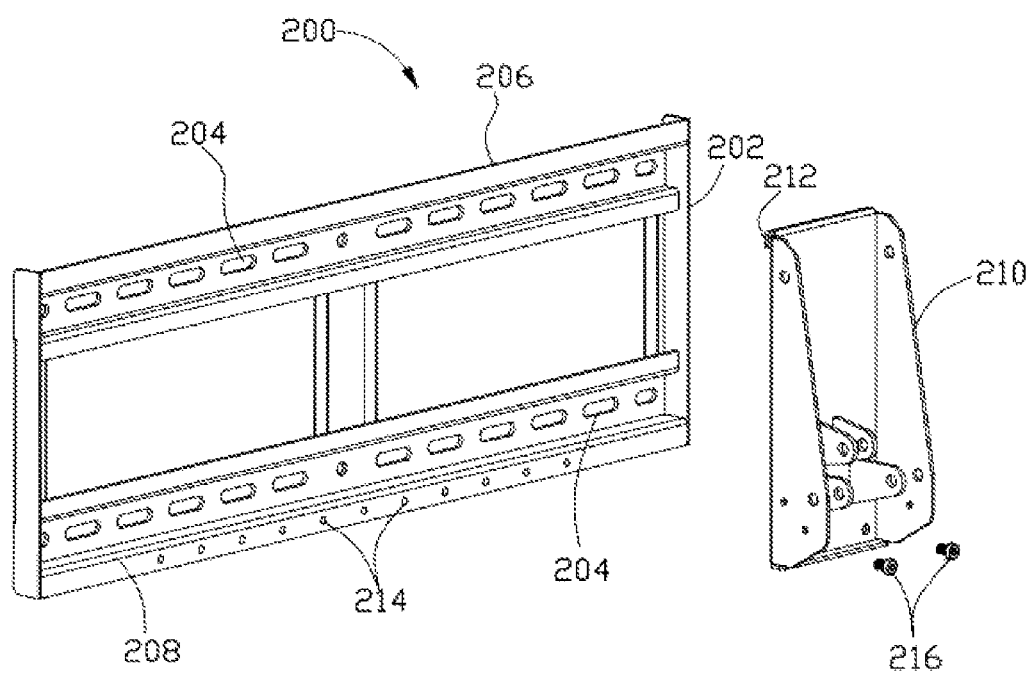
FIG. 16 is a separated perspective of an optional bracket system for attaching the mount to a wall.

FIG. 16 illustrates an optional mounting support system, generally designated by 200, for use instead of the bracket 22. The system 200 includes a frame, generally designated by 202, having a plurality of openings 204 allowing the frame to be mounted securely on a variety of wall structures using conventional anchors. For example, in the case of a wall comprising sheetrock applied over wood studs, the frame 202 may be anchored to adjacent studs. The frame 202 has an upper cleat 206 and a lower strip 208 that extend the full width of the frame. Further, the system 200 includes a bracket, generally designated by 210, similar to the previously described bracket 22 but having a hook 212 along its upper edge. Once the frame 202 is anchored to a wall, the hook 212 on the bracket 210 is hung on the cleat 206. A series of threaded holes 214 provided along the lower strip 208 allows the bracket 210 to be fastened in place using fasteners 216. As will be appreciated, the series of holes 214 permits the bracket 210 to be mounted in various horizontal positions along the frame 202. Thus, the frame 202 may be laterally positioned on the wall so the mount is securely anchored to the wall, and the bracket 210 may be laterally positioned on the frame to center the bracket over a feature such as a fireplace.

Figure 17:
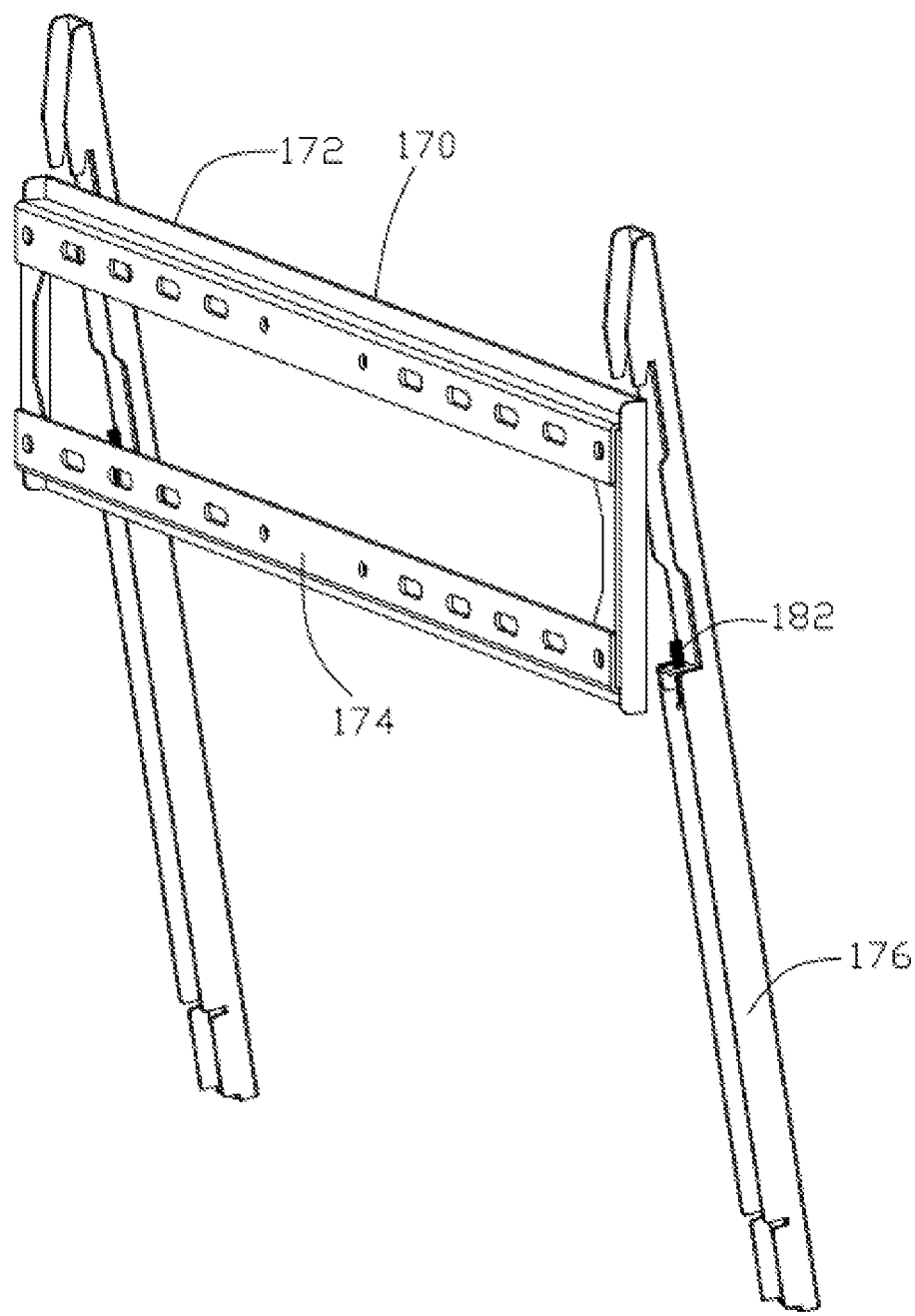
FIG. 17 is perspective showing a step of hanging vertical display screen supports on a portion of the screen support.

Once the mount 20 is positioned on the wall, the display screen is attached to the mount. The vertical support members 176 of the screen support 28 are fastened to a back surface of the display screen. With the vertical members 176 attached to the display screen, the cross member 184 (FIG. 2) can be attached between the support members and the handle assembly 188 is attached to the cross member. Once the support members 176 are securely attached to the display screen, the screen is positioned as shown in FIG. 17 to hook the openings 178 in the support members 176 over the upper crossbar 172 on the mount. Once hooked, the display screen is rotated against the lower crossbar 174 and the screw fastener 182 are installed to securely attach the display screen to the hanger 170.

Figure 18A:
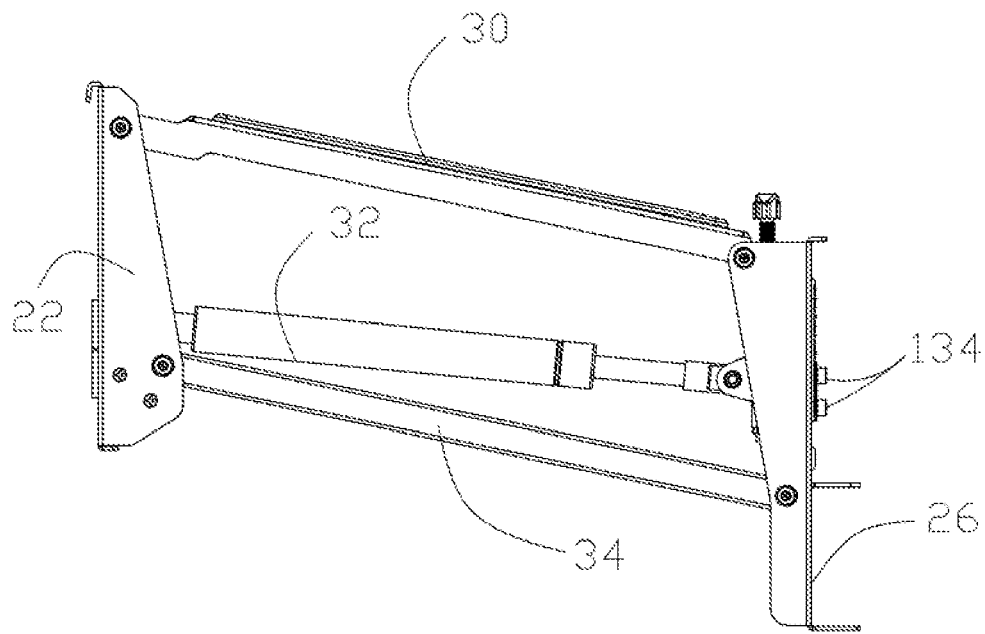
FIGS. 18A and 18B are side elevations of the mount showing a balance adjustment mechanism positioned in opposite extremes.
Figure 18B:
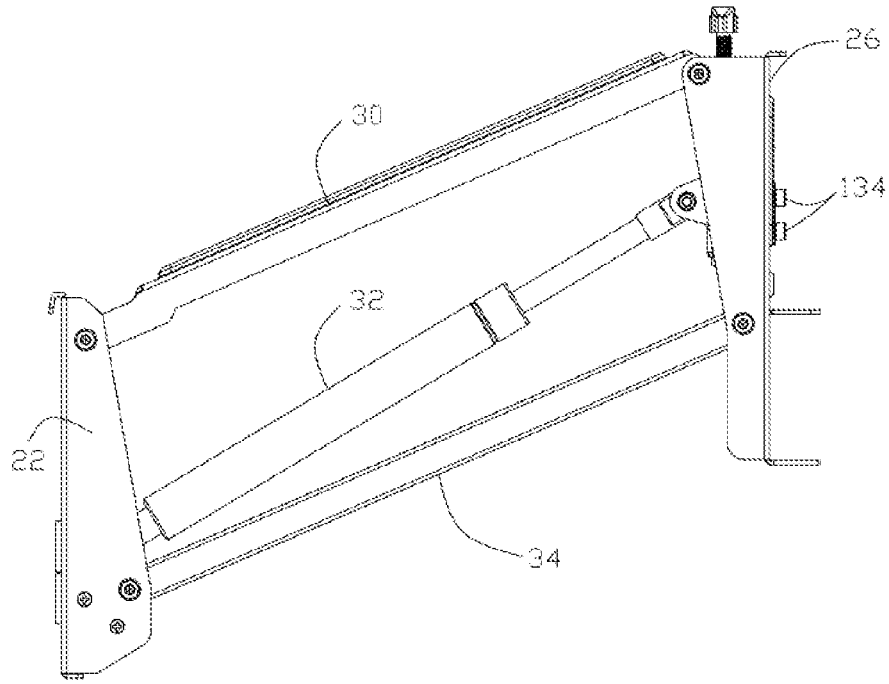

With the mount 20 secured to the wall W and the display screen S secured to the mount, the balance adjustment mechanism 26 may be adjusted using the key 120 so a user can easily move the mount between the stowed position and the lowest position. To adjust the mechanism 26 the user threads the key 120 into the appropriate threaded reinforcement 118 on the brace 84 and rotates the key to push the slide body 88 along the rails 86. The key 120 may be threaded into the upper reinforcement 118 to push the slide body 88 toward its lowest position on the rails 86 as shown in FIG. 18A, or the key may be threaded into the lower reinforcement to push the slide body toward its highest position on the rails as shown in FIG. 18B. When the slide body 88 is in its lowest position on the rails 86, the air spring 32 carries the least load. And, when the slide body 88 is in its highest position on the rails 86, the air spring 32 carries the most load, making it easier to lift the display screen. Once an appropriate load balance is achieved, the key 120 may be removed and the screws 134 tightened to lock the mechanism 26 in position.

The description above provides an example of an adjustable mount for a display screen. Those of ordinary skill in the art may make improvements and modifications to the described mount without departing from the principles of the present disclosure. These improvements and modifications are regarded as being within the scope of this description. As various changes could be made to the constructions and methods described herein, all matter contained in the above description or shown in the accompanying drawings should be interpreted as illustrative and not in a limiting sense. The patentable scope of the disclosure is defined by the claims, and may include other constructions and methods that would occur to those skilled in the art. Such constructions are intended to be within the scope of the claims when the structure of the constructions is recited by the literal language of the claims, or when the constructions include equivalent structural elements having insubstantial differences from the literal language of the claims. To the extent that the specification, the accompanying drawings, and the claims disclose additional subject matter that is not within the scope of the claims, the disclosures are not dedicated to the public and the right to file one or more applications having claims directed to the additional disclosures is reserved.

When introducing elements of the present invention or the preferred example(s) thereof, the articles "a", "an", "the" and "said" are intended to mean that there are one or more of the elements. The terms "comprising", "including" and "having" are intended to be inclusive and mean that there may be additional elements other than the listed elements.

When introducing elements in this description and the claims, the articles "a", "an", "the", and "said" are intended to indicate one or more of the elements. The terms "comprising", "including", and "having" are intended to be inclusive and indicate there may be additional elements other than the listed elements.

The invention claimed is:

1. An adjustable mount for mounting a display screen on a selected vertical surface, the mount comprising:
    a bracket adapted for anchoring the bracket to the selected vertical surface;
    an elongated upper link pivotally connected to the bracket;
    a faceplate adapted for operatively connecting the display screen thereto pivotally connected to the upper link, said faceplate having a rail extending downward and below the upper link;
    a body slidably mounted on the rail;
    a clamp alternatively operable to hold the body at a selected position on the rail and to permit the body to move with respect to the rail;
    a pair of elongated bars, each bar of said pair of elongated bars being pivotally connected to the bracket below the upper link and pivotally connected to the faceplate below the upper link; and
    a gas spring pivotally connected to the bracket below the upper link and above each bar of said pair of bars, said gas spring being pivotally connected to the body;
    wherein the faceplate is moveable relative to the bracket when anchored to the vertical surface to raise and lower the display screen relative to the vertical surface when the display screen is connected to the faceplate; and
    wherein a force required to move the faceplate relative to the bracket changes depending upon the selected position of the body on the rail.

2. The adjustable mount as set forth in claim 1 further comprising:
    a threaded key;
    wherein the faceplate includes a threaded opening sized for threadedly receiving said key and aligned so the key extends parallel to the rail and in line with the body; and
    wherein turning the key moves the body along the rail to change the force required to move the faceplate relative to the bracket.

3. The adjustable mount as set forth in claim 2 wherein the key is selectively removable from the threaded opening.

4. The adjustable mount as set forth in claim 3 wherein:
    said threaded opening is a first threaded opening positioned above the body;
    the faceplate includes a second threaded opening positioned below the body and sized for threadedly receiving said key and aligned so the key extends parallel to the rail and engages the body;
    turning the key in the first threaded opening pushes the body downward along the rail; and
    turning the key in the second threaded opening pushes the body upward along the rail.

5. The adjustable mount as set forth in claim 2 wherein the faceplate includes a scale for determining a position of the body on the rail.

6. The adjustable mount as set forth in claim 1 wherein:
    said rail is a first rail;
    the faceplate has a second rail extending downward below the upper link parallel to said first rail; and
    the body is slidable attached to the first rail and the second rail.

7. The adjustable mount as set forth in claim 1 further comprising:
    a pivot plate pivotally connected to the faceplate for selective rotation with respect to the faceplate above a vertical axis, said pivot plate being adapted for operatively connecting with the display screen thereby connecting the display screen to the faceplate via the pivot plate;
    wherein the pivot plate is selectively rotatable relative to the bracket to rotate the display screen relative to the vertical surface when the bracket is anchored to the vertical surface and the display screen is connected to the pivot plate.

8. The adjustable mount as set forth in claim 7 further comprising:
    a tilt plate pivotally connected to the pivot plate for rotation with respect to the pivot plate about a horizontal axis, said tilt plate being adapted for operatively connecting with the display screen thereby connecting the display screen to the faceplate via the tilt plate and the pivot plate;
    wherein the tilt plate is selectively rotatable relative to the pivot plate to rotate the display screen relative to the vertical surface when the bracket is anchored to the vertical surface and the display screen is connected to the pivot plate.

9. The adjustable mount as set forth in claim 1 further comprising:
    a tilt plate pivotally connected to the pivot plate for rotation with respect to the pivot plate about a horizontal axis, said tilt plate being adapted for operatively connecting with the display screen thereby connecting the display screen to the faceplate via the tilt plate;
    wherein the tilt plate is selectively rotatable relative to the pivot plate to rotate the display screen relative to the vertical surface when the bracket is anchored to the vertical surface and the display screen is connected to the pivot plate.

10. The adjustable mount as set forth in claim 1 wherein the faceplate maintains a constant angular orientation with respect to the bracket as the faceplate moves relative to the bracket.

11. An adjustable mount for mounting a display screen on a selected vertical surface, the mount comprising:

a bracket adapted for anchoring the bracket to the selected vertical surface;

an elongated upper link pivotally connected to the bracket;

a faceplate adapted for operatively connecting the display screen thereto pivotally connected to the upper link;

a pair of elongated bars, each bar of said pair of elongated bars being pivotally connected to the bracket below the upper link and pivotally connected to the faceplate below the upper link; and a gas spring having a bracket end pivotally connected to the bracket below the upper link and above each bar of said pair of bars, said gas spring having a faceplate end opposite said bracket end operatively connected to the faceplate for pivoting relative to the faceplate and for moving up and down relative to the faceplate to a selected position; and wherein the faceplate is moveable relative to the bracket when anchored to the vertical surface to raise and lower the display screen relative to the vertical surface when the display screen is connected to the faceplate; and wherein a force required to move the faceplate relative to the bracket changes depending upon the selected position of the body faceplate end of the gas spring relative to the faceplate.

12. The adjustable mount as set forth in claim 11 further comprising a clamp alternatively operable to hold the gas spring at a selected vertical position relative to the faceplate.

13. The adjustable mount as set forth in claim 11 wherein the faceplate maintains a constant angular orientation with respect to the bracket as the faceplate moves relative to the bracket.

\* \* \* \* \*